United States Patent [19]

Hatakeyama

[11] Patent Number: 5,157,902

[45] Date of Patent: Oct. 27, 1992

[54] METHOD AND APPARATUS FOR FORMING OXYGEN-ABSORBER ACCOMMODATION PARCELS

[75] Inventor: Hidetoshi Hatakeyama, Tokyo, Japan

[73] Assignee: Mitsubishi Gas Chemical Co., Inc., Japan

[21] Appl. No.: 706,032

[22] Filed: May 28, 1991

Related U.S. Application Data

[62] Division of Ser. No. 433,331, Nov. 8, 1989.

[30] Foreign Application Priority Data

Nov. 9, 1988 [JP] Japan .................................. 63-281174

[51] Int. Cl.⁵ .............................................. B65B 55/19
[52] U.S. Cl. ............................................ 53/492; 53/141;
53/381.4; 53/402; 53/381.2
[58] Field of Search .................. 53/492, 381.4, 381.1,
53/381.2, 402, 401, 400, 472, 474, 468, 435, 111
R, 513, 396, 133.1, 141, 389.3; 206/204, 484.2,
484.1

[56] References Cited

U.S. PATENT DOCUMENTS

| | | | |
|---|---|---|---|
| 3,415,702 | 12/1968 | Bauder | 53/400 X |
| 3,990,872 | 11/1976 | Cullen | 206/204 X |
| 4,332,845 | 6/1982 | Nawata et al. | 206/204 |
| 4,421,235 | 12/1983 | Moriya | 206/524.2 |
| 4,579,223 | 4/1986 | Otsuha et al. | 206/204 |
| 4,586,311 | 5/1986 | Becherer et al. | 53/492 X |
| 4,646,510 | 3/1987 | McIntyre | 53/141 X |
| 4,657,133 | 4/1987 | Komatsu et al. | 206/204 |
| 4,667,814 | 5/1987 | Wakamatsu et al. | 206/204 X |
| 4,752,002 | 6/1988 | Takahashi et al. | 206/204 |
| 4,769,175 | 9/1988 | Inoue | 206/484.2 X |
| 4,832,505 | 5/1989 | Ausnit et al. | 53/410 X |
| 4,856,649 | 8/1989 | Inoue | 206/204 |
| 4,856,650 | 8/1989 | Inoue | 206/204 |

FOREIGN PATENT DOCUMENTS 55170272 6/1980 Japan .

Primary Examiner—James F. Coan
Attorney, Agent, or Firm—Leydig, Voit & Mayer

[57] ABSTRACT

An oxygen-absorber accommodation parcel in which an air-impermeable material is superimposed on and peelably bonded to an air-permeable face of an air-permeable accommodation parcel which accommodates an oxygen-absorber compound. In the case of strip-formed continuous parcels in which accommodation parcels are connected side-by-side in one direction, a strip-formed air-impermeable material is bonded to the continuous parcels. During use, the air-impermeable material is peeled and removed from the strip-formed continuous parcels and, immediately thereafter, the strip-formed continuous parcels from which the air-impermeable material has been removed is cut along each connecting seal portion into individual oxygen-absorber accommodation parcels.

5 Claims, 8 Drawing Sheets

METHOD AND APPARATUS FOR FORMING OXYGEN-ABSORBER ACCOMMODATION PARCELS

This application is a divisional of application Ser. No. 07/433,331 filed Nov. 8, 1989.

BACKGROUND OF THE INVENTION

1. Field of the Invention

The present invention relates generally to de-oxidizers and, more particularly, to a method and an apparatus for forming strip-formed continuous parcels for accommodating oxygen absorbers which make it possible to supply de-oxidizers in a form which can be handled without severe limitations on working time. In the present specification and the drawings attached thereto, the term "strip-formed continuous parcels" means a parcel structure in which a plurality of parcels each of which accommodates an oxygen-absorber compound are arranged one after another in the form of a strip.

2. Description of the Related Art

In the field of the art of preserving foods, preserving arts employing de-oxidizers are known, and the range of applications of such a preserving art has been widening from the preservation of various foods to that of medicines and, in addition, mechanical parts or the like.

The de-oxidizer is a product of the type in which a compound for absorbing oxygen (an oxygen absorber) is commonly charged into a small air-permeable parcel. The de-oxidizer together with objects to be preserved such as foods, machines, mechanical parts or the like (hereinafter referred to simply as "object") is hermetically enclosed within a packaging container to remove the oxygen in the container by absorption, thereby maintaining the quality of the object. The preserving art employing such a de-oxidizer is wide-spread among food manufacturers or the like in that the quality of products can be held for a long time merely by performing the simple operation of simultaneously enclosing de-oxidizers and products with packaging containers.

However, serious problems arise while de-oxidizer and objects are being enclosed within packaging containers. In general, de-oxidizers are marketed in a form in which a multiplicity of de-oxidizers, normally several tens to several hundreds, are packed in one outer parcel made of a material (for example, polyvinylidene chloride-coated nylon) of the kind through which oxygen does not easily permeate. As is well known, immediately after the outer parcel has been opened, the de-oxidizers start to absorb oxygen. Accordingly, once the outer parcel is opened, the de-oxidizers together with objects must be enclosed with packaging containers within an extremely limited time. If de-oxidizers which have been exposed to the air for an unduly long time are enclosed within packaging containers together within objects, the de-oxidizers can no longer completely absorb the oxygen in the containers. It becomes impossible, therefore, to maintain the quality of the objects over the requisite time period. This drawback may lead to various problems such as an increase in the number of returned goods, the occurrence of food poisoning and the like. Accordingly, food manufacturers must pay close attention to control of the time period required to handle de-oxidizers. In particular, in a system in which strip-formed continuous de-oxidizer parcels are automatically cut by an automatic charging apparatus to automatically package the individual de-oxidizer parcels together with objects, the more the number of successive parcels in each strip, the greater the merit of the automation. However, the number of successive parcels per strip is limited to a certain extent due to limitations imposed on the time period required to handle the de-oxidizers.

In addition, even if de-oxidizers are left in the atmosphere for a while after the outer parcel has been opened, the de-oxidizers must be able to retain their function sufficient to preserve objects. Accordingly, de-oxidizer manufacturers must produce de-oxidizers provided with a somewhat excessive oxygen-absorbing capability, with the result that the manufacturers must charge a greater amount of oxygen absorber than would otherwise be unnecessary. This problem leads to not only an increase in manufacturing costs but also an increase in the size of each de-oxidizer. The increase in size will impose inconvenient limitations on the form of a package used for enclosing a de-oxidizer and an object. The above-described problems become more serious, particularly when de-oxidizers having larger oxygen absorbing rates are employed. Accordingly, although it has been known that the oxygen in packages must be removed as rapidly as possible from the standpoint of preservation of foods, in the current situation the greater the oxygen absorbing rates of de-oxidizers, the more difficult the manufacture thereof.

Various proposals have been made in order to solve the above-described disadvantages which may be experienced during handling of de-oxidizers:

A) A de-oxidizer is known which is designed so that it does not start to absorb oxygen before it absorbs the moisture of an object after they have been packaged.

However, this known type of de-oxidizer has a number of problems:

1) If the de-oxidizer is not combined with an object of the type which contains a relatively large amount of moisture and which has a moisture activity of 0.7 or more, the moisture, hence oxygen, is not easily absorbed by the de-oxidizer. As a result, the kind of object to which the de-oxidizer is applicable is limited.

2) Even in the case of an object of the type which satisfies the conditions described in Paragraph 1), there are some cases where the moisture, hence oxygen, is not easily absorbed by the de-oxidizer, if the object is enclosed within a packaging container at an inappropriate position or in an inappropriate form.

3) The oxygen absorbing rate of the de-oxidizer does not rise until the de-oxidizer absorbs a sufficient amount of moisture. Accordingly, such a de-oxidizer is unsuitable for use in removing oxygen in a short time.

B) As another proposed method, it is considered that individual de-oxidizers are wrapped with parcels of material which do not easily allow permeation of oxygen, each de-oxidizer being taken out of the parcel immediately before it is packaged together with an object.

This proposed method is also undesirable for the following reasons:

1) The manufacturing costs of de-oxidizers increase to such an extent that the method cannot be utilized in practice.

2) Handling problems similar to those described above occur in the process, from the manufacturing of the de-oxidizers to the packaging thereof.

3) It is impossible to provide strip-formed continuous de-oxidizer parcels of the type which can be easily packaged together with objects in an automatic packaging apparatus.

Accordingly, the problem of limitations being imposed on the time period required to handle de-oxidizers still remains to be solved from the viewpoints of manufacturing processes, sales, usage and so on, and this problem is more serious for de-oxidizers having larger oxygen-absorbing rates.

SUMMARY OF THE INVENTION

It is, therefore, an object of the present invention to provide a de-oxidizer of the type in which no oxygen absorption is performed up to a moment immediately before use so that the de-oxidizer can be handled without severe limitations on working time and, in addition, which enables effective utilization of an automatic charging apparatus.

The present inventor has conducted intensive research on the improvement of de-oxidizers in light of the problems explained in the description of the related art, and developed an improved parcel for accommodating an oxygen absorber. The parcel has a dual structure in which an air-impermeable material is peelably bonded to an air-permeable material. Up to a moment immediately before the parcel is packaged together with an object to be preserved, the parcel is held substantially in an air-impermeable state wherein no oxygen is absorbed, so that no oxygen absorber is consumed. By peeling and removing at least a part of the air-impermeable material immediately before packaging, it is possible to give the de-oxidizer an air-permeable function sufficient to absorb oxygen. With the de-oxidizer having the above-described structure, it is possible to solve the problems mentioned above. In addition to the development of such an oxygen-absorber accommodation parcel, the present inventor has investigated a method of cutting strip-formed continuous parcels having the above-described structure. In this manner, the present invention was successfully accomplished.

More specifically, in accordance with one aspect of the present invention, there is provided an oxygen-absorber accommodation parcel including a parcel element which accommodates an oxygen-absorber compound and an air-impermeable material superimposed on and peelably bonded to the air-permeable face of of the parcel element.

In accordance with another aspect of the present invention, there is provided a method which includes the steps of successively removing at least part of an air-impermeable material from strip-formed continuous parcels without cutting the air-impermeable material, the successive parcels being continuously manufactured and each accommodating an oxygen absorber, and cutting the strip-formed continuous parcels into individual oxygen-absorber accommodation parcels immediately after the removal of the air-impermeable material has been completed.

In the present invention, a heat-sealble air-permeable material which has heretofore been used for de-oxidizers may be employed as the parcel which forms the air-permeable face of the parcel. Typical examples are: a laminate in which a porous polyethylene material is superimposed on and bonded to a paper material made of machine-made paper, Japanese paper, rayon paper or the like; an unwoven fabric of polyolefin or the like; a microporous film; and a laminate in which a porous polyethylene material is superimposed on and bonded to the unwoven fabric or the microporous film. Since the present invention is effectively applied to de-oxidizers of the type having particularly large oxygen-absorbing rates, it is preferable that an air-permeable material having a Gurley permeability of 10,000 sec./100 cc or less be employed. In addition, if consideration is given to the facts that an outer material superimposed on and peelably bonded to the outside of an inner parcel is at least partially removed by peeling before use to expose a surface of the inner parcel, it is also preferable to use, for example, a laminate in which a porous polyethylene material is bonded to paper subjected to water-proof and/or oil-proof treatment, a laminate in which a porous polyethylene material and a porous polyester material are respectively bonded to the opposite surfaces of paper subjected to water-proof and/or oil-proof treatment, or a laminate in which a microporous film is bonded to a porous polyethylene material. However, the kind of air-permeable material is not limited to these examples alone. Incidentally, the portions other than the air-permeable face of the air-permeable parcel need not be formed of a specific material and may be made of any kind of material that is generally used as a wrapping material.

The air-impermeable material, which is superimposed on and peelably bonded to the air-permeable face of the air-permeable parcel, is made of material of the kind which has a sufficiently low air-permeability which is substantially equal to air-impermeability when compared to the air-permeability of the air-permeable face of the air-permeable parcel. Typical examples are: a plastic film of polyester, polypropylene, nylon, cellophane and the like; a composite material in which any of them is coated with polyvinylidene chloride; a composite material in which aluminum is deposited on any of them; a laminate in which a sealant material of polyethylene, EVA or the like for assuring laminated bonding to an inner parcel is superimposed on and bonded to any of the above materials; and a product in which any of the above materials is coated with an adhesive also for assuring the laminted bonding. Among the above examples, the laminate in which the sealant material is superimposed on the above materials is most preferable. In addition, paper or film may be bonded to any of these materials in a superimposed state for the purposes of printing or maintaining the aesthetic appearance.

Such a parcel structure consisting of the above-described air-permeable parcel and air-impermeable material may be in any form provided that the air-impermeable material covers the air-permeable face of the air-permeable parcel. However, the form in which an inner parcel is airtightly accommodated in a parcel made of an air-impermeable material is not appropriate since it has the same problems as does the form explained in Paragraph B) in the description of the related art. From the viewpoints of the structure of a wrapping apparatus used for manufacturing de-oxidizers, the necessity to minimize the difference between the time period required to form the inner parcel and that required to form the outer material, the ability to manufacture strip-formed continuous parcels, or other requirements for solving the problems explained in the description of the related arts, it is preferable that any one be selected from among the following three kinds: 1) a form in which opposite faces of a three-sided fin seal parcel made of an air-permeable material are covered with an air-impermeable material; 2) a form in which opposite faces of a four-sided fin seal parcel made of an air-permeable material are covered with an air-impermeable material; and 3) a form in which a four-sided fin seal parcel has one face made of an air-impermeable material and the other face made of an air-permeable material, the face of the air-impermeable material being covered with an air-impermeable material. In any of the forms, it is particularly preferable that the air-impermeable material and the air-permeable parcel share at least two of the four sides.

In addition, if an excessive "fin" is formed by offsetting an edge of the air-permeable parcel from a corresponding edge of the air-impermeable material or by sealing a portion which is slightly inward of the edge, the efficiency of the operation of removing the air-impermeable material by peeling prior to using the de-oxidizer can be effectively improved.

When the air-impermeable material is to be superimposed on and peelably bonded to the air-permeable face of the air-permeable parcel for covering purposes, it is preferable that either method be selected between the following two methods: 1) a method including the steps of bonding the air-impermeable material and the air-permeable parcel material in a superimposed state by means of a peelable adhesive, a peelable heat seal or the like to prepare one wrapping material and forming this wrapping material into a three-sided fin seal parcel or a four-sided fin seal parcel by an established process; and 2) a method including the steps of introducing the air-impermeable material and the air-permeable parcel material into a wrapping apparatus in a merely superimposed state wherein they are not bonded; and peelably bonding the edge portion of the air-impermeable material to the air-permeable face of the parcel.

By accommodating an oxygen absorber in the oxygen-absorber accommodation parcel which is formed by either of these methods, a de-oxidizer can be handled without severe limitations on working time.

The oxygen absorber can be thus accommodated in the parcel in a substantially air-impermeable state during a parcel manufacturing process by means of various kinds of automatic parcel-producing and wrapping apparatus. Accordingly, once the accommodating process is completed, the amount of oxygen which will be absorbed until an air-impermeable material portion is removed by peeling before use is extremely small. Accordingly, the oxygen absorber is not consumed before use, whereby it can effect its function when it is packaged together with an object to be preserved. This feature improves quality control since the feature enables de-oxidizer manufacturers to allocate a sufficient time period for inspection, packaging and other required processes after manufacturing processes.

In a case where food manufactures or the like utilize de-oxidizers employing parcels which are thus formed in accordance with the present invention, the air-impermeable material portions are peeled and removed from the parcels by the hands of workmen or by means of jigs or machines, and the de-oxidizers are immediately packaged together with objects to be preserved. In this process, only a part of each air-impermeable material portion may be removed so that users can freely adjust the air-permeability of the de-oxidizers. From this viewpoint as well, the de-oxidizers according to the present invention are superior to conventional types of de-oxidizers. In the case of de-oxidizers of the type whose air-impermeable material portion can also be partially peeled and removed, an air-impermeable material which employs a uniaxially stretched film as a base may be utilized so that a portion can be easily removed over a constant width by tearing the material in the direction of film stretching.

In recent years, automatic de-oxidizer charging apparatus have gained in popularity since they can achieve automatic cutting of strip-formed de-oxidizer parcels and automatic packaging of de-oxidizers and objects. De-oxidizers employing the parcels according to the present invention can be produced in such a manner that the parcels are arranged in side-by-side relationship in the direction parallel to two sides along which each air-impermeable material and a corresponding air-permeable parcel are sealed in common. Accordingly, in accordance with the invention, strip-formed continuous parcels can be easily obtained. In the case of such strip-formed continuous parcels, a part or the whole of the air-impermeable material is continuously peeled and removed from each parcel without cutting and, immediately after the removal, the air-permeable parcel portion is cut into individual parcels. The use of such strip-formed continuous parcels provides a solution to the conventional problems which have been experienced in the process of automatically charging de-oxidizers. In this process, since the removed portions are continuously rejected from the charging apparatus, it is possible to prevent the removed portions from being accidentally packaged with objects to be preserved. As an additional desirable feature, since the rejected removed portions can be wound around a bobbin or the like, the requisite postprocessing an be easily achieved.

Further objects, features and advantages of the present invention will become apparent from the following detailed description of embodiments of the present invention with reference to the accompanying drawings.

DETAILED DESCRIPTION OF THE PREFERRED EMBODIMENTS

Embodiments of the present invention will be explained below with reference to the accompanying drawings.

Figure 1:
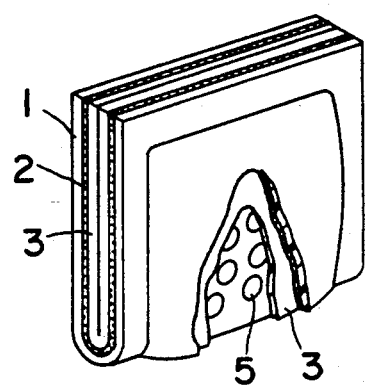
FIG. 1 is a partially broken away perspective view showing a first embodiment of an oxygen-absorber accommodation parcel according to the present invention.

FIG. 1 shows a first embodiment of an oxygen-absorber accommodation parcel according to the present invention, and there is shown a so-called three-sided fin seal parcel of the type which is made from a sheet-like material. The sheet-like material is folded, and the folded part constitutes one side with the other three sides sealed. In the figure, reference numeral 1 denotes an air-impermeable material, reference numeral 2 a peelable adhesive layer for lamination, reference numeral 3 an air-permeable material, and reference numeral 5 an oxygen absorber.

Figure 2:
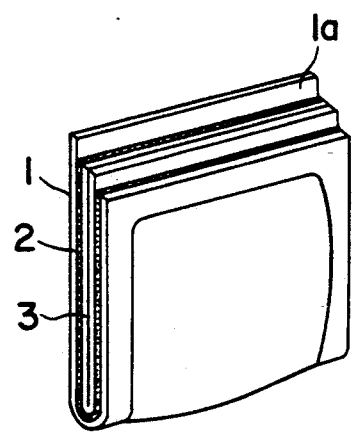
FIG. 2 is a perspective view showing a second embodiment of the present invention.

FIG. 2 shows a second embodiment of the present invention. In the illustrated oxygen-absorber accommodation parcel made from a three-sided fin seal parcel, the air-impermeable material 1 and the air-permeable material 3 are superimposed on each other in such a manner that the opposite ends of the material 1 are slightly offset from the corresponding ends of the material 3 to provide a fin 1a. By pulling the fin 1a, the air-impermeable material 1 can be readily peeled from the air-permeable material 3.

Figure 3:
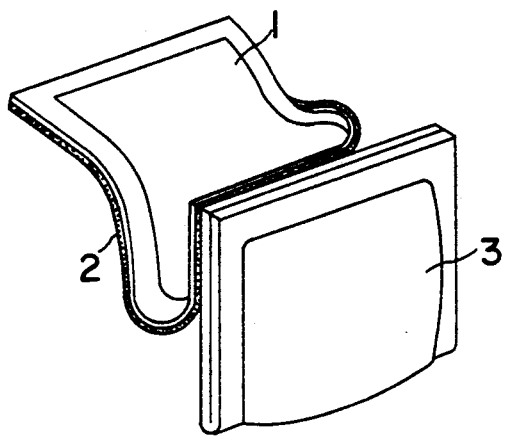
FIG. 3 is a perspective view which shows a state wherein an air-impermeable material is peeled from the oxygen-absorber accommodation parcel of FIG. 1.

FIG. 3 shows a state wherein the air-impermeable material 1 is peeled from the accommodation parcel according to the first embodiment described above.

Figure 4:
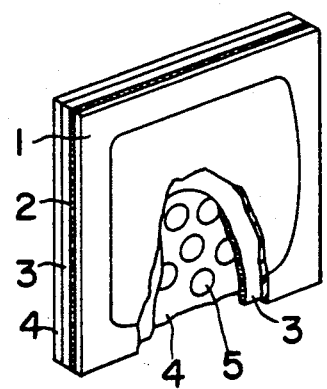
FIG. 4 is a partially broken away perspective view showing a third embodiment of the present invention.

FIG. 4 shows a third embodiment of the present invention, and there is shown a so-called four-sided fin seal parcel of the type in which all the four sides of the oxygen-absorber accommodation parcel are sealed. One face of this accommodation parcel consists of the air-permeable material 3, while the other face consists of an air-impermeable material 4. A separate air-impermeable material 1 is superimposed on and peelably bonded to the air-permeable material 3 by an adhesive layer 2.

Figure 5:
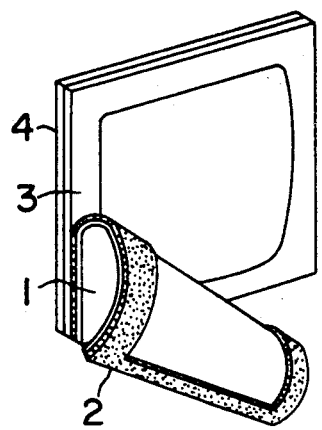
FIG. 5 is a perspective view showing a state wherein an air-impermeable material is peeled from the oxygen-absorber accommodation parcel of FIG. 4.

FIG. 5 shows a state wherein the air-impermeable material 1 is peeled from the accommodation parcel according to the third embodiment.

Figure 6:
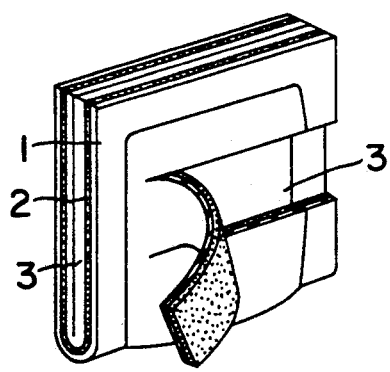
FIG. 6 is a perspective view showing a state wherein part of an air-impermeable material is peeled from the oxygen accommodation parcel of FIG. 1.

FIG. 6 shows a state wherein a part of the air-impermeable material 1 is peeled from the accommodating parcel according to the first embodiment described above.

Figure 7:
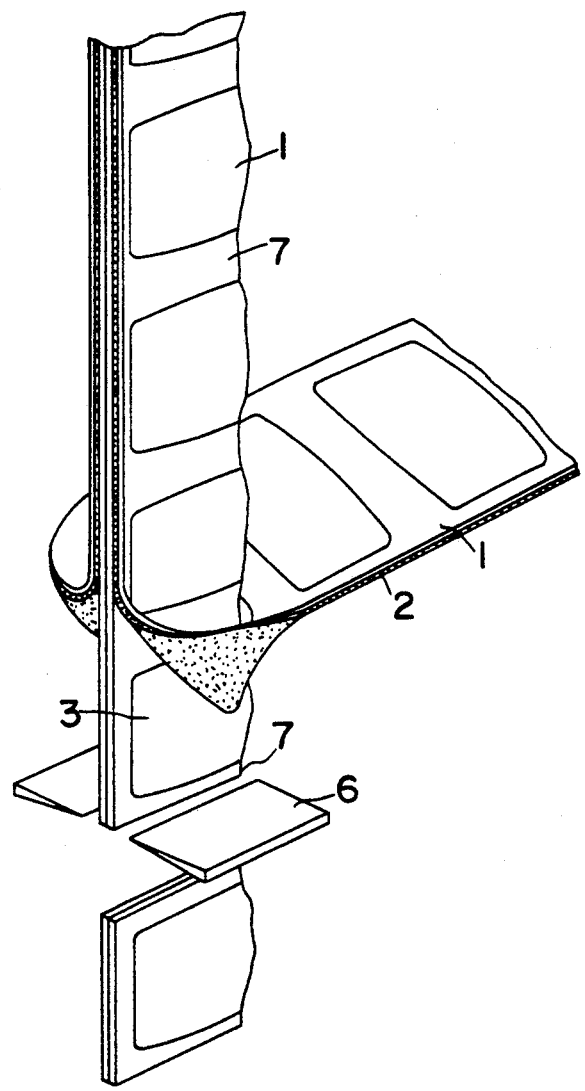
FIG. 7 is a perspective view showing a fourth embodiment of the present invention.

FIG. 7 shows one exemplary form of strip-formed continuous parcels which consist of a plurality of three-sided fin seal parcels each serving as an oxygen-absorber accommodation parcel according to the present invention. In this example, after the air-impermeable material 1 has been successively peeled from the strip-formed continuous parcels, the strip-formed continuous parcels are successively automatically cut at each lateral seal portion 7 by a cutter assembly 6 so that individual oxygen-absorber accommodation parcels capable of absorbing oxygen are provided.

Figure 8:
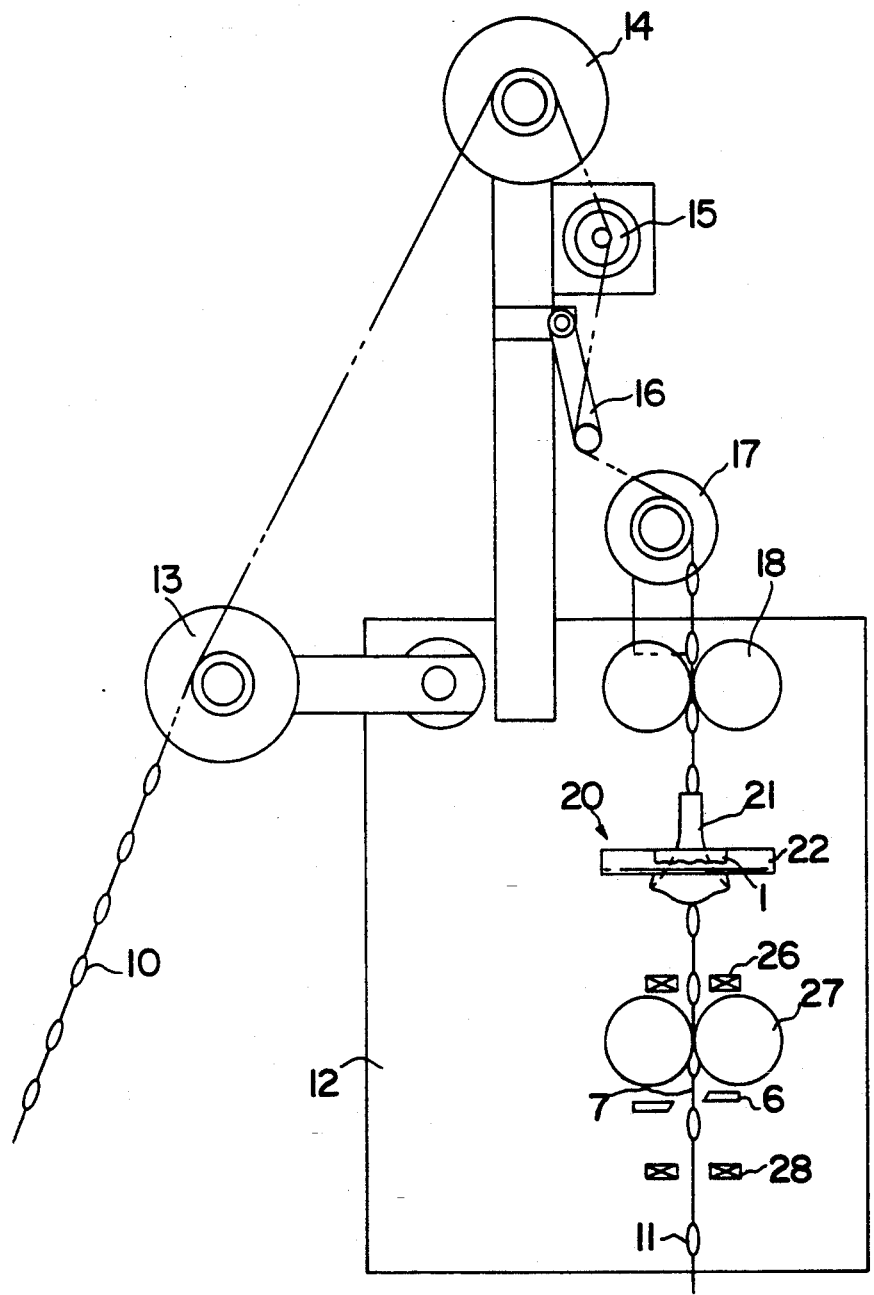
FIG. 8 is a diagrammatic front elevational view showing one example of an automatic cutting apparatus suitable for use in the present invention.
Figure 9:
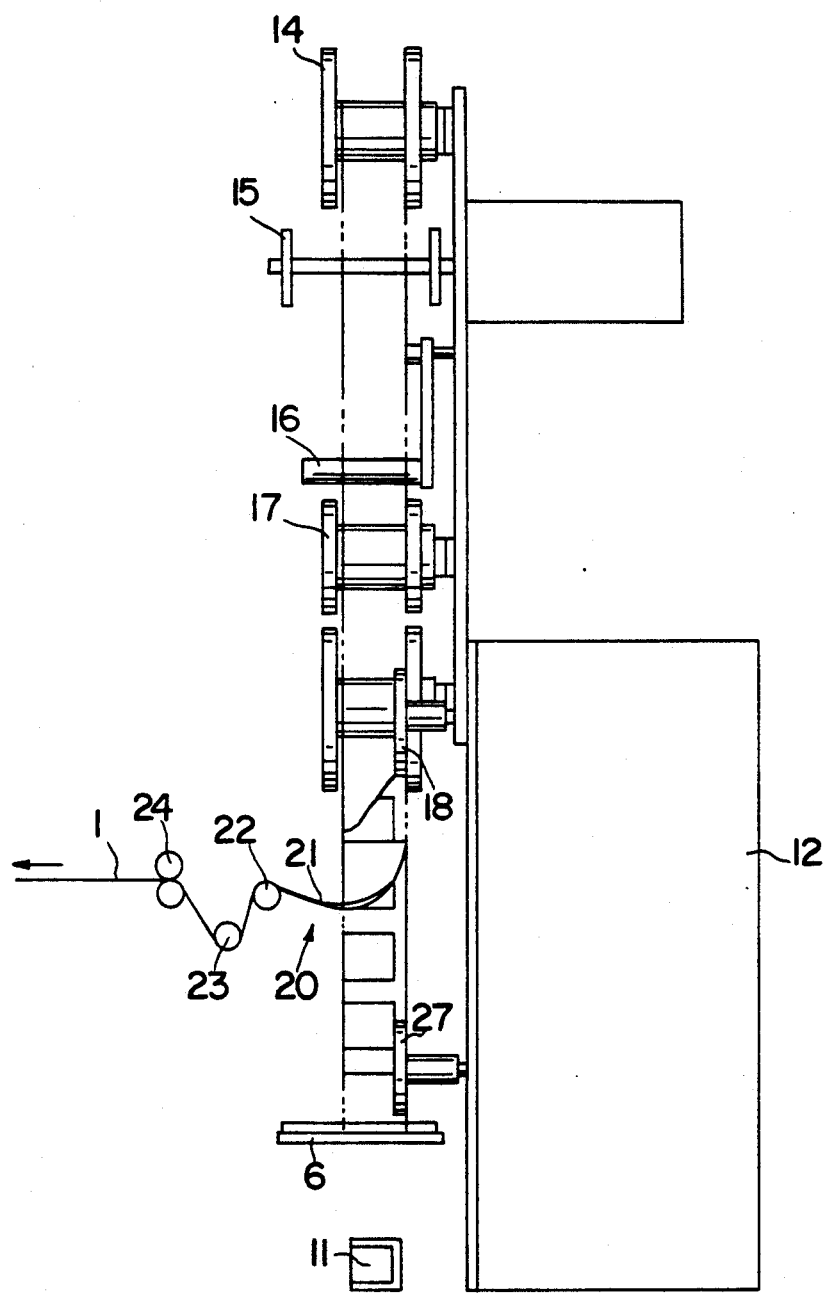
FIG. 9 is a diagrammatic side elevational view of the automatic cutting apparatus shown in FIG. 8.

FIGS. 8 and 9 diagrammatically show the whole of an automatic cutting apparatus designed for the above-described strip-formed continuous parcels. In each of the figures, reference numeral 10 generally denotes strip-formed continous parcels which consist of oxygen-absorber accommodation parcels each having a three-sided fin seal structure. The strip-formed continuous parcels 10 are transported into a body 12 of the illustrated automatic cutting apparatus along a path which is formed by guide rollers 13 and 14 extending from the body 12, a vibrator 15, a tension roller 16, and a guide roller 17. The strip-formed continuous parcels 10 thus transported are sequentially retained by a pair of pressure rollers 18 so that it travels along a path which extends in a predetermined direction, and is thereby fed to a peeling section 20.

Figure 10:
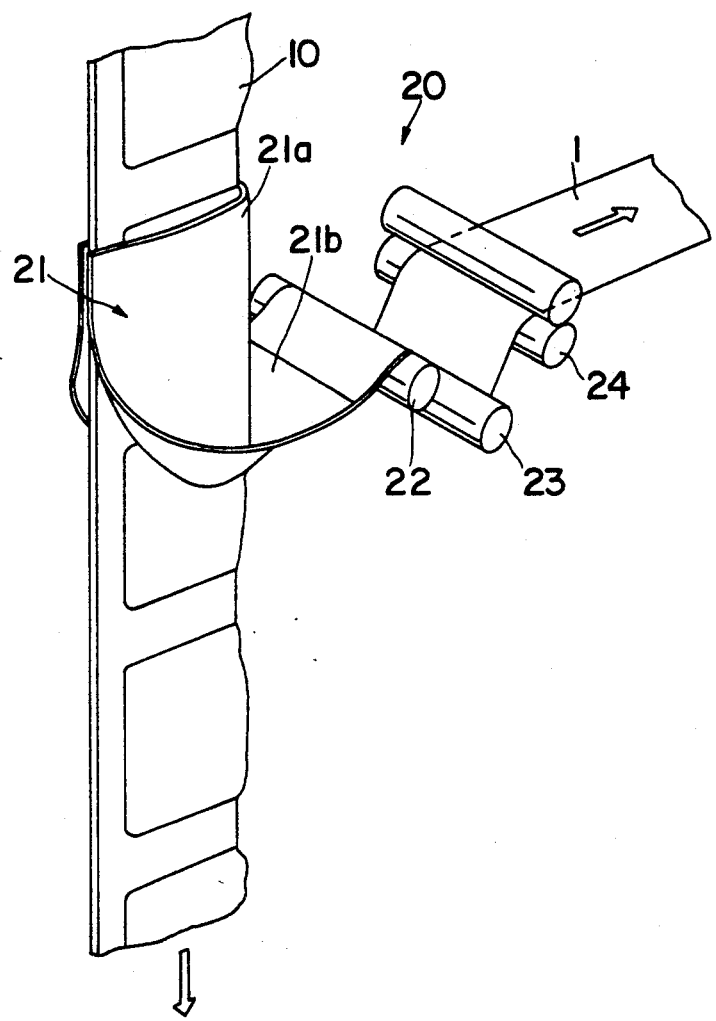
FIG. 10 is an enlarged perspective view showing a peeling section in the apparatus of FIG. 8.

In the peeling section 20, as also shown in FIG. 10, the air-impermeable material 1, which is superimposed on the external surface of the strip-formed continuous parcels 10, is peeled from the body of the strip-formed continuous parcels 10 in the direction of the folded part of the material 1. In such an arrangement, if the air-impermeable material 1 is peeled off by means of an automatic machine, the strip-formed continuous parcels 10 are pulled in the direction in which the air-impermeable material 1 is peeled, with the result that the strip-formed continuous parcels 10 may be deviated from the normal travel path thereof. In consequence, it is likely that the following cutting position of the strip-formed continuous parcels 10 will deviate or that the strip-formed continuous parcels 10 will come away from a device for guiding the strip-formed continuous parcels 10 while they are traveling. To prevent such a phenomenon, a guide member 21 is provided in the peeling section 20 to relax tension which is applied to the strip-formed continuous parcels 10 while the material 1 is being peeled and to assure smooth and reliable peeling of the material 1. The guide member 21 comprises an erected holding portion 21a for holding the parcels 10 along the travel path and a skirt portion 21b for guiding the peeled material 1 along the under-surface thereof in such a manner that the peeled material 1 does not abruptly change its path so as to prevent the sideward peeling force from being directly transmitted onto the body of the parcels 10. This guide member 21 or its skirt portion 21b also performs the function of making flat the folded air-impermeable material 1 after it has been peeled. The peeled material 1 which has been made flat by the guide member 21 is guided by a guide roller 22, a tension roller 23, and a pair of transporting rollers 24, whereby the peeled material 1 is smoothly wound around, for example, a bobbin (not shown).

Figure 11:
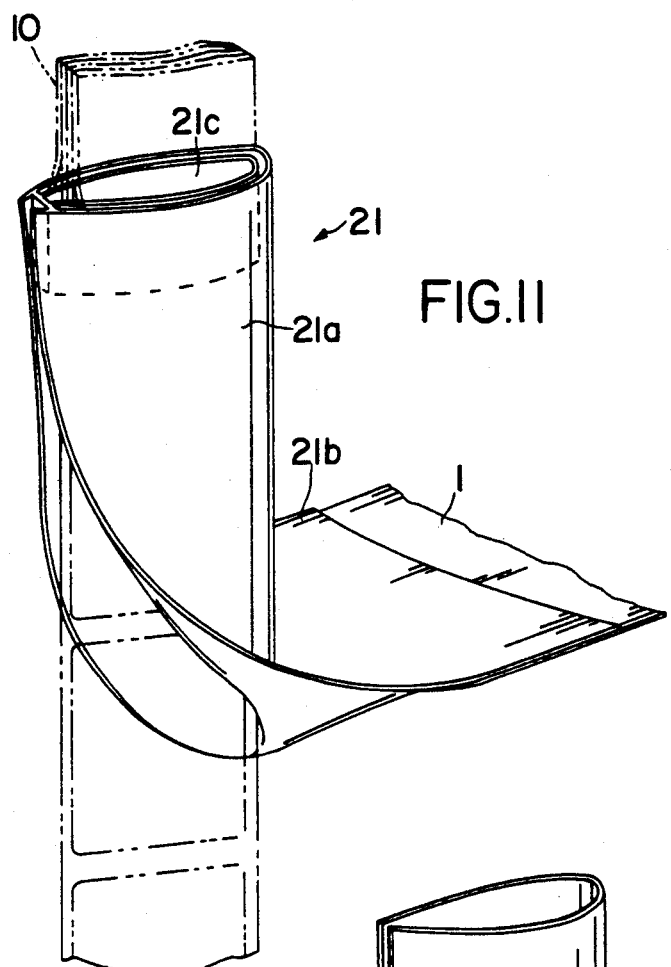
FIG. 11 is an enlarged perspective view showing an alternative example of a guide member.
Figure 12:
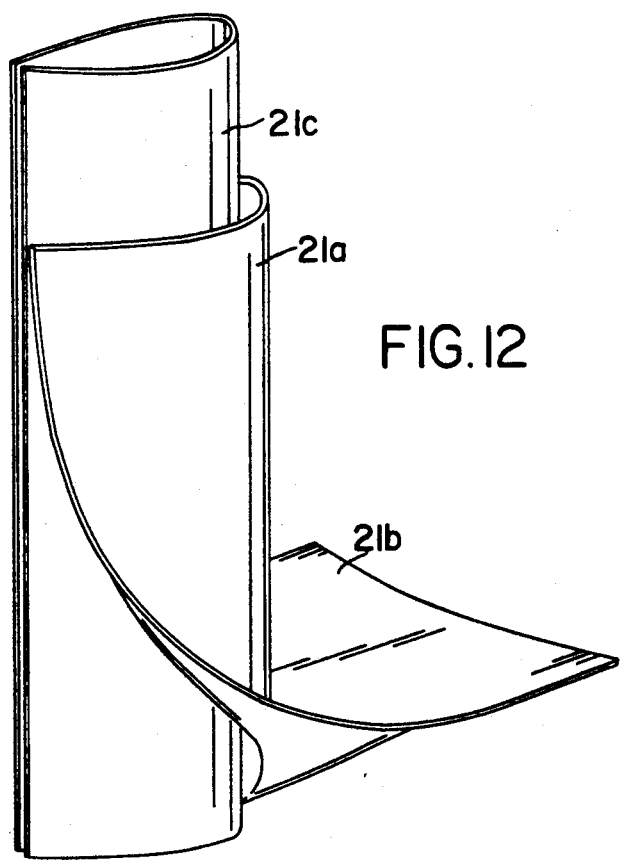
FIG. 12 is an enlarged perspective view showing another example of a guide member.

FIGS. 11 and 12 show alternative examples of the guide member 21, respectively. In both examples, an inner member 21c is provided inside the holding portion 21a so as to define a path for the peeled material 1 and facilitate the smooth peeling of the material 1 from the body of the parcels 10. FIG. 11 shows the inner member 21c with a short length and FIG. 12 with a long length especially for securely holding the body of the parcels 10 along the travel path.

In the above manner, the air-impermeable material 1 is peeled from the strip-formed continuous parcels 10 and the air-permeable material 3 lying inward of the material 1 is exposed. The body of the strip-formed continuous parcels 10 is then fed to the cutter assembly 6 through a sensor assembly 26 for detecting the part of each accommodation parcel which is charged with an oxygen absorber as well as a pair of transporting rollers 27. On the basis of the result of the detection made by the sensor assembly 26, the cutter assembly 6 successively cut the strip-formed continuous parcels 10 at the respective lateral seal portions 7, thereby forming individual oxygen-absorber accommodation parcels 11. A sensor assembly 28 is provided for detecting the leading end of each of the accommodation parcels 11, and is arranged to reliably detect the cut length of each accommodation parcel 11 without being influenced by tension produced during the peeling of the air-impermeable material 1.

Since one pair of pressure rollers 18 and one pair of transporting rollers 27 are disposed on the upstream and downstream sides of the peeling section 20, it is possible to reliably prevent the strip-formed continuous parcels 10 from deviating due to tension produced during the peeling of the air-impermeable material 1.

Instead of the arrangement used in the embodiment described above, the peeling section 20 may be arranged so that the folded part of the air-impermeable material 1 is cut in the longitudinal direction into two separate pieces to allow the separate pieces to be peeled laterally in mutually opposite directions. If this arrangement is utilized, the process of making the material 1 flat can be omitted and the winding of the peeled material 1 around the bobbin or the like is therefore facilitated.

EXAMPLE 1

A 90-mm wide film and a 90-mm wide PET film were prepared as an air-permeable material 3 having a Gurley permeability of 400 sec./100 cc and as an air-impermeable material 3 having the tradename of Toray 20P27K, respectively. The 90-mm wide film consisted of a laminate of porous polyethylene and machine-made paper coated with a water-proof and oil-proof compound, and the 90-mm wide PET film had one surface coated with a heat-seal peeling compound. These materials were superimposed on each other in such a manner that the paper side of the air-permeable material 3 faced the heat-seal peeling compound of the air-impermeable material 1, and the superimposed materials were then introduced into an automatic charging/wrapping apparatus of the three-sided fin seal type. In this apparatus, an iron-powder type oxygen absorber was charged into the inside of the the porous polyethylene film and the paper coated with the water-proof and oil-proof compound in amount of 4 g for each parcel while the outer surface of the air-impermeable material was being heated for sealing purposes by means of a bar heater. In this manner, strip-formed continuous parcels consisting of three hundred 45 mm×50 mm de-oxidizer parcels were prepared.

The thus-obtained strip-formed de-oxidizer parcels were fed into an automatic de-oxidizer charging apparatus, where the air-permeable material 3 or the air-impermeable material 1 was successively peeled and removed at a rate of 20 parcels/min. with neither of the materials 1 and 3 cut. During this time, the air-permeable parcel portions which were left immediately after the removal were cut into individual parcels.

Each of the de-oxidizer parcels and a single bun with a meat filling were enclosed within a KON/PE package (KON:polyvinylidene chloride-coated nylon) together with 500 cc of air at intervals of 30 minutes after the beginning of the cutting process. Then, as each of the KON/PE packages was preserved at a temperature of 25° C., a variation in the oxygen concentration of the package with time was measured to obtain the time period (de-oxidizing time period) elapsed until the oxygen concentration reached 0.1%. In addition, these packages were opened two weeks later, and the state of the bun preserved in each of the packages was examined. The result is shown in Table 1.

EXAMPLE 2

A 390-mm wide laminated film (air-impermeable material 1) and a 390-mm wide film (peelable wrapping material 3) were prepared. The air-impermeable material 1 consisted of a laminate of a polyethylene material and a PET film having a reverse surface on which one-color characters and a white-painted area were printed. The peelable wrapping material had a structure in which a PET film (an air-impermeable material 1) was bonded to a polyethylene unwoven fabric (air-permeable material 3) having a Gurley permeability of 5 sec./100 cc in a superimposed manner by a peelable adhesive. The air-impermeable material 1 and the peelable wrapping material were combined with the polyethylene side of the air-impermeable material 1 facing the polyethylene-unwoven-fabric side of the peelable wrapping material and introduced into a four-sided fin seal type of automatic charging/wrapping apparatus for continuously produced strip-formed continuous parcels consisting of seven parcels. In this apparatus, an iron-powder type oxygen absorber was charged in the amount of 4 g for each parcel while sealing was being performed by means of a heat die roll. Through a cutting process, strip-formed continuous parcels consisting of three thousand 50 mm×52 mm de-oxidizer parcels were prepared.

The thus-obtained strip-formed de-oxidizer parcels were cut into individual parcels in a manner similar to that used in Example 1. A preservation test similar to that of Example 1 was also conducted with these de-oxidizer parcels. The result is shown in Table 1.

COMPARATIVE EXAMPLE 1

An air-permeable material 3 was introduced into a three-sided fin seal type of automatic charging/wrapping apparatus, where an iron-powder type oxygen absorber was charged into the inside of the the porous polyethylene film layer in the amount of 4 g for each parcel while sealing was being effected by means of a bar heater. In this manner, strip-formed continuous parcels consisting of three thousand 45 mm×50 mm de-oxidizer parcels were prepared.

The thus-obtained strip-formed de-oxidizer parcels were successively cut into individual parcels at a rate of 20 parcels/min. by means of an automatic de-oxidizer charging apparatus. A preservation test similar to that of Example 1 was also conducted with these oxidizer parcels. The result is shown in Table 1.

COMPARATIVE EXAMPLE 2

The air-impermeable material 1 and the 390-mm wide air-permeable material 1 were combined with the polyethylene side of the air-impermeable material 1 facing inside and introduced into a four-sided fin seal type of automatic charging/wrapping apparatus for successively producing strip-formed continuous parcels consisting of seven parcels. In this apparatus, an iron-powder type oxygen absorber was charged in the amount of 4 g for each parcel while sealing was being performed by means of a heat die roll. Through a cutting process, strip-formed continuous parcels consisting of three thousand 50 mm×52 mm de-oxidizer parcels were prepared.

The thus-obtained strip-formed de-oxidizer parcels were successively cut into individual parcels at a rate of 20 parcels/min. by means of an automatic de-oxidizer charging apparatus. A preservation test similar to that of Example 1 was also conducted with these oxidizer parcels. The result is shown in Table 1.

TABLE 1

|  | Example 1 | Example 2 | Comparative example 1 | Comparative example 2 |
| --- | --- | --- | --- | --- |
| TIME ELAPSED AFTER START OF CUTTING | | | | |
| 0 min. | 3 | 2 | 3 | 2 |
|  | o | o | o | o |
| 30 min. | 3 | 2 | 5 | 4 |
|  | o | o | o | o |
| 60 min. | 3 | 2 | 30 | 40 |
|  | o | o | Δ | Δ |
| 90 min. | 3 | 2 | x | x |
|  | o | o | x | x |
| 120 min. | 3 | 2 | x | x |
|  | o | o | x | x |
| 150 min. | 3 | 2 | x | x |
|  | o | o | x | x |

In each set of rows of Table 1,
the upper row: de-oxidizing time period (Hr). x: de-oxidization stopped midway in the process
the lower row: state of the bun preserved
   o: good; Did not turn sour.
   Δ: putrid; Was inedible.
   x: moldy; Was too musty to eat.

As is apparent from the foregoing, in accordance with the present invention, it is possible to provide a de-oxidizer of the type in which no oxygen absorber is consumed up to the moment immediately before the use thereof so that the de-oxidizer can be handled without severe limitations on working time and, in addition, which enables effective utilization of an automatic charging apparatus. Accordingly, de-oxidizer users such as food manufacturers can carry out wrapping of objects to be preserved without severe limitations on handling time and with time to spare. Moreover, the use of strip-formed de-oxidizer parcels makes it possible to improve the efficiency of automatic cutting and automatic supply of de-oxidizer parcels in an automatic charging apparatus. Accordingly, the de-oxidizer according to the present invention also excels in economical terms. In addition, it is possible to prevent imperfect preservation of foods or occurrence of food poisoning which may originate in an overlong handling of de-oxidizers, with the result that excellent safety can be achieved in that there is no risk of consumers suffering damage from the imperfect preservation of foods.

The use of such a de-oxidizer enables de-oxidizer manufactures to supply users with de-oxidizers having large oxygen-absorbing rates which have conventionally been difficult to supply as well as strip-formed continuous parcels including such de-oxidizers. In addition, as for the de-oxidizer manufactures, the amount of oxygen absorber per de-oxidizer can be reduced and the miniaturization of de-oxidizers can be achieved, whereby the range of applications of de-oxidizers is widened and economical benefits can be enjoyed. Furthermore, since the time period required to inspect manufactured de-oxidizers prior to wrapping can be made long compared to conventional inspection time, the de-oxidizer according to the present invention is also beneficial from the viewpoint of quality control.

What is claimed is:

1. A method of producing an oxygen-absorber accommodation parcel, comprising the steps of:
   producing laminated type of oxygen-absorber accommodation continuous parcels which contain oxygen-absorber compounds, strip-formed continuous parcels including a plurality of parcel structures each of which accommodates said oxygen-absorber compounds, each of said parcel structures being connected to an adjacent parcel structure by a lateral seal portion such that said parcel structures are arranged side-by-side in one direction, said continuous parcels having at least one face serving as an air-permeable portion having air-permeability, and a strip-formed air-impermeable element peelably bonded to said strip-formed continuous parcels to cover said air-permeable face of said strip-formed continuous parcels;
   continuously peeling and removing said strip-formed air-impermeable element from said laminated type of oxygen-absorber accommodation continuous parcels; and
   cutting said strip-formed parcels along each of said lateral seal portions immediately after said step of peeling and removing said strip-formed air-impermeable element has been completed, thereby preparing individual oxygen-absorber accommodation parcels.

2. A method according to claim 1, wherein said continuous parcels, when positioned at the location where said strip-formed air-impermeable element is continuously peeled and removed from said continuous parcels, are held on opposite longitudinal sides to assume a reference position.

3. An apparatus for producing an oxygen-absorber accommodation parcel, comprising:
   a guide mechanism for guiding and transporting laminated continuous parcels which includes strip-formed continuous parcels including a plurality of parcel structures each of which accommodates an oxygen-absorber compound, each of said parcel structures being connected to an adjacent parcel structure by a lateral seal portion such that said parcel structures are arranged side-by-side in one direction, said continuous parcels having an air-permeable face to which a strip-formed air-impermeable element is peelably bonded;
   a peeling mechanism for peeling said strip-formed air-impermeable element from said laminated continuous parcels which are being successively transported;
   holding means disposed upstream and downstream of said peeling mechanism for holding said continuous parcels in a predetermined transport path; and
   a cutting mechanism disposed downstream of said holding means for cutting each of said lateral seal portions of said strip-formed continuous parcels from which said strip-formed air-impermeable element has been removed.

4. An apparatus according to claim 3, wherein said holding means is a roller.

5. An apparatus according to claim 3, wherein said peeling means is provided with guide means for guiding said removed strip-formed air-impermeable element.

* * * * *